(12) United States Patent
Yeom

(10) Patent No.: US 6,456,967 B1
(45) Date of Patent: Sep. 24, 2002

(54) METHOD FOR ASSEMBLING A VOICE DATA FRAME

(75) Inventor: Eung-Moon Yeom, Uiwang-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/467,685

(22) Filed: Dec. 21, 1999

(30) Foreign Application Priority Data

Dec. 23, 1998 (KR) ............................................. 98-57869

(51) Int. Cl.[7] ........................ G10L 19/00; G06F 13/00; H04L 1/00
(52) U.S. Cl. ........................ 704/220; 704/500; 709/231
(58) Field of Search ................................ 704/270, 220, 704/275, 500; 370/352, 353, 356, 401; 709/231

(56) References Cited

U.S. PATENT DOCUMENTS

| 6,157,636 | A | * | 12/2000 | Voit et al. ..................... 370/353 |
| 6,157,648 | A | * | 12/2000 | Voit et al. ..................... 370/401 |
| 6,175,871 | B1 | * | 1/2001 | Schuster et al. ............. 709/231 |
| 6,289,010 | B1 | * | 9/2001 | Voit et al. ..................... 370/352 |
| 6,292,481 | B1 | * | 9/2001 | Voit et al. ..................... 370/352 |
| 6,295,292 | B1 | * | 9/2001 | Voit et al. ..................... 370/352 |
| 6,304,567 | B1 | * | 10/2001 | Rosenberg .................... 370/356 |
| 6,366,959 | B1 | * | 2/2002 | Sidhu et al. .................. 709/231 |

* cited by examiner

*Primary Examiner*—Susan McFadden
(74) *Attorney, Agent, or Firm*—Steve Cha; Klauber & Jackson

(57) ABSTRACT

A method for variably controlling the number of packets constituting a voice data frame according to the traffic condition to secure the real-time transmission of voice data. The method comprises the steps of: upon the receipt of a voice data frame, storing a stamp time of the voice data frame and the number of packets constituting the voice data frame; removing an RTP header included in the voice data frame and storing the RTP header-removed voice data in a receiving buffer; calculating an anticipated delay time depending on the stored packet number when there is a previously received frame; calculating an error time depending on the difference between an actual delay time and the anticipated delay time; increasing the number of packets constituting the transmission frame when the error time is greater than a threshold value; decreasing the number of packets constituting the transmission frame when the error time is less than the threshold value; updating the DSP component data with the changed packet number; setting a valid flag in a transmission buffer when the updated number of packets is written in the transmission buffer; and, reading the updated number of packets from the transmission buffer to assemble a transmission frame.

7 Claims, 4 Drawing Sheets

METHOD FOR ASSEMBLING A VOICE DATA FRAME

CLAIM OF PRIORITY

This application makes reference to, incorporates the same herein, and claims all benefits accruing under 35 U.S.C. Section 119 from an application for METHOD FOR VARYING FRAME STRUCTURE IN LOCAL AREA NETWORK filed in the Korean Industrial Property Office on Dec. 23, 1998 and there duly assigned Ser. No. 98-57869.

BACKGROUND OF THE INVENTION

1. Field of the Invention

The present invention relates generally to a voice data processing system, and in particular, to a method for transmitting voice data in real time regardless of the traffic generated in a transmission line.

2. Description of the Related Art

In general, an effective and high-speed data transmission is very important in a communication network. With regard to the bandwidth for data transmission, the voice data does not require a wide bandwidth because the voice data can be compressed from 64 Kbps to 16 Kbps by digital encoding (or compressing). However, for video data transmission, a data transfer rate of about 1.5–6 Mbps is required, and the video compression technique as set forth by MPEG (Moving Picture Experts Group) is used to compress the video data while maintaining high quality. In addition, for data communication an additional bandwidth of over 10 Mbps is required.

However, for effective and high-speed data transmission, the network should be able to satisfy the communication quality required by the respective transmission media as well as the wide bandwidth requirement. The communication quality is referred to as a quality of service (QoS), which depends on the media and applications. For example, in an internet phone service, the quality of service depends on the ability to transmit voice data in real time from the transmission side to the receiving side with a little delay as possible, and the ability to retrieve the voice data at the receiving side from the transmission side with as little jitter as possible.

Accordingly, many efforts have been made to improve the QoS in the data transmission system, especially to minimize the jitter problem. With regard to the operation of the data transmission system to improve the transmission of the voice data, a controlled transmission environment is created to enhance the transmission through a protocol prior to the transmission of the compressed voice data. The controlled transmission environment is set by determining the type of packets to be transmitted and the type of the transmission method. For example, when the transmission line exhibits a good transmission quality, a transmission packet is assembled by adding a plurality of data cells to a given header prior to transmission. On the other hand, the transmission packet is assembled with a fewer number of data cells to a given header when poor transmission quality exists. The purpose of such implementation is to improve transmission efficiency by attaching a plurality of data cells to one header rather than attaching one data cell to one header to a data cell. As the number of bits required for the header in assembling one frame affects the transmission, adding more data cells to a given cell improves the transmission efficiency. Such data frame assembling method is set forth in ITU-T (International Telecommunication Union-Telecommunication standardization sector) Recommendation H.245.

However, when using the above method, the data is transmitted with a fixed frame (RTP multi-frame) determined by the initial setup process regardless of the change in the traffic condition and remains unchanged until the call is ended, thereby causing the following problems:

(1) when receiving the voice data through a LAN (Local Area Network) having an irregular bandwidth, the voice data is not received at regular intervals, thus the low delay jitter requirement cannot be satisfied;

(2) the voice data is reproduced intermittently, thus deteriorating the quality of a call; and, (3) the writing of DSP (Digital Signal Processor) exhibits a long waiting time, causing an increase in the processing delay time and reducing the utilization efficiency of the system.

SUMMARY OF THE INVENTION

It is, therefore, an object of the present invention to provide a method for selectively controlling the number of packets constituting a voice data frame according to the traffic condition, thereby securing the real-time transmission of the voice data.

It is another object of the present invention to provide a method for controlling the number of packets constituting a voice data frame in response to the transmission delay of the voice data, thereby increasing the transmission efficiency.

To achieve the above objects, there is provided a method for assembling a voice data frame in a voice data processing system. The method comprising the steps of: upon the receipt of a voice data frame, storing a stamp time of the voice data frame and the number of packets constituting the voice data frame; removing an RTP header included in the voice data frame and storing the removed RTP header in a receiving buffer; calculating an anticipated delay time in response to the current packet number in view of a previously received frame; calculating an error time based on the difference between the actual delay time and the anticipated delay time; increasing the number of packets constituting the transmission frame when the error time is greater than a threshold value; decreasing the number of packets constituting the transmission frame when the error time is less than the threshold value; updating the DSP component data with the newly determined packet number; setting a valid flag for the transmission buffer when the updated number of packets are written; and reading the updated number of packets from the transmission buffer to assemble the next voice data frame.

The anticipated delay time is determined by multiplying the stored reference processing time by the packet number. The actual delay time is determined according to the difference between the stored time stamp and the time stamp of the previously received frame.

A BRIEF DESCRIPTION OF THE DRAWINGS

The above and other and further objects, features and advantages of the present invention will become more apparent from the following detailed description when taken in conjunction with the accompanying drawings in which.

A DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

A description of the present invention will be made with reference to a system that transmits the voice data using a vocoder. The vocoder supports the compression technique as set forth in the ITU-T (International Telecommunication Union-Telecommunication standardization sector) Recommendation G. 723.1 and G.729.

The most important difference between the compression technique specified in the ITU-T Recommendation G.723. 1 and the compression technique specified in the ITU-T Recommendation G.729 is a sampling period, which is an important factor in compressing the voice data. The G.723. 1 compression technique transmits the voice data by 20 or 24 bytes at the sampling period of 30 ms, and the G.729 compression technique transmits the voice data by 10 bytes at the sampling period of 10 ms. Accordingly, the receiving side disassembles the received voice data at every 30 ms or 10 ms depending on the compression technique selected.

However, when the voice data is transmitted through a LAN having an irregular bandwidth, the voice data can not be received at either the 30 ms or 10 ms interval as set forth by one of the ITU recommendations, causing a deterioration in the transmission quality. Therefore, according to the embodiment of the present invention, the receiving side varies the number of packets constituting a frame in response to a delay time, thereby solving the transmission delay problem and enhancing the transmission efficiency.

According to the present invention, the term "frame" refers to a data format for exchanging the data between a transmission side and a receiving side, and the term "packet" refers to a packet of voice data compressed by a vocoder. A frame can be comprised of one or more packets. Further, the data received for RTP (Real-time Transport Protocol) processing after performing the UDP (User Datagram Protocol) processing will be referred to as a voice data frame, and the data to which an RTP header is not yet attached by the RTP processing during the transmission or the RTP header-removed data during the receiving mode will be referred to as voice data (payload data). The RTP header indicates the header attached to the voice data to be transmitted by the RTP prepared in the transmission side's system. The RTP header stores a time stamp and an RTP data size. The time stamp refers to the reference processing time (e.g., 30 ms or 10 ms) which depends on the type of the vocoder used in the transmission side of the system.

Figure 1:
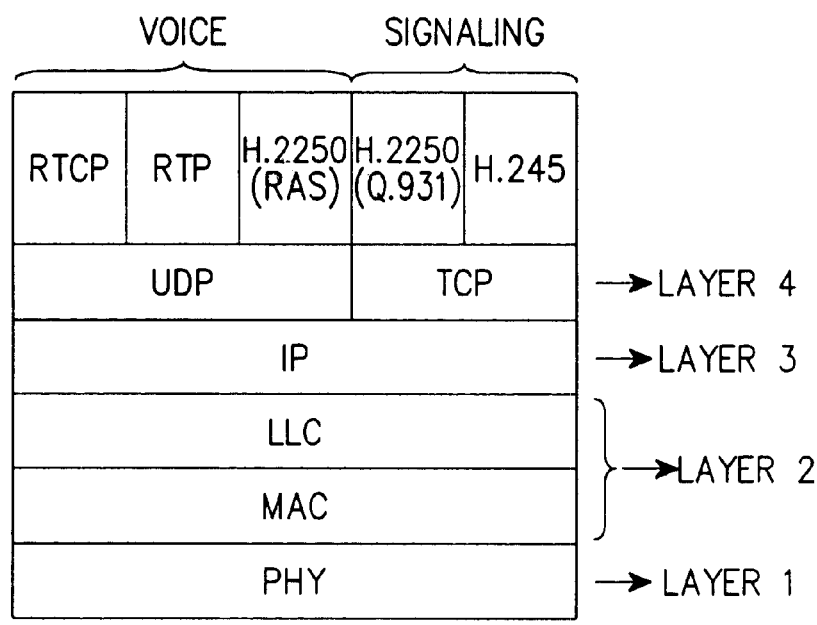
FIG. 1 is a diagram illustrating an OSI (Open Systems Interconnection) reference model in accordance with the present invention.
Figure 2:
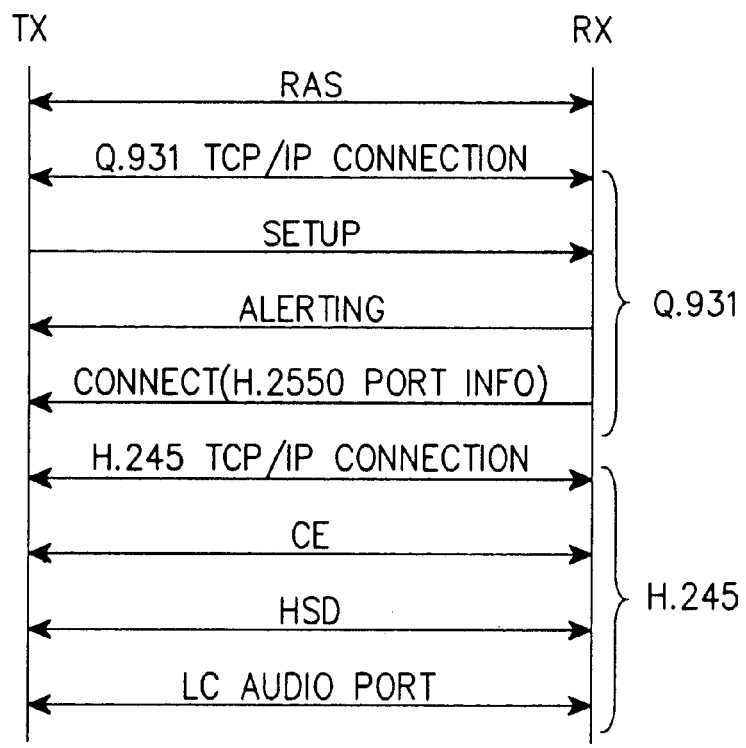
FIG. 2 is a diagram illustrating a protocol performed between the transmission side and the receiving side in a data processing system in accordance with the present invention.

In FIG. 1 and FIG. 2, a description will be made relating to an operation of the system according to the present invention. FIG. 1 illustrates an OSI (Open Systems Interconnection) reference model having multi-layered function blocks in a voice transmission system, and FIG. 2 illustrates a protocol performed between the transmission side and the receiving side in order to transmit the voice data.

In FIG. 1, the OSI reference model includes a physical (PHY) layer for the first layer; a medium access control (MAC) layer and a logical link control (LLC) layer for the second layer; an internet protocol (IP) for the third layer; a user datagram protocol (UDP) and a transmission control protocol (TCP) for the fourth layer; and a real-time transport control protocol (RTCP), a real-time transport protocol (RTP), H.2250 (RAS), H.2250 (Q.931) and H.245 for the upper layer. The upper layer and the fourth layer are divided into a voice processing path and a signaling path. The voice processing path includes the RTCP, RTP, H.2250 (RAS), and UDP, and the signaling path includes the H.2250 (Q.931), H.245, and TCP. The H.2250 (Q.931) performs the call signaling, the H.2250 (RAS) performs the verification procedure, and H.245 performs the call control.

In this structure, the headers corresponding to the layers are attached to the voice data when the voice data to be transmitted passes the respective layers. That is, for the voice data, the headers are added by the RTCP, RTP, H.2250 (RAS) and UDP, and then provided to the IP. For the signaling data, the headers are added by H.2250 (Q.931), H.245 and TCP, and then provided to the IP. Thereafter, the headers are added through the same layers, and the header-added voice data packet is transmitted to the receiving side's system through the physical layer PHY. The receiving side's system then acquires the voice data in the reverse order.

FIG. 2 shows a protocol performed in the signaling path of FIG. 1. As illustrated, H.2250 (Q.931) sets up the TCP/IP connection, and thereafter, H.245 sets up the TCP/IP connection and transmits the voice data.

Figure 3:
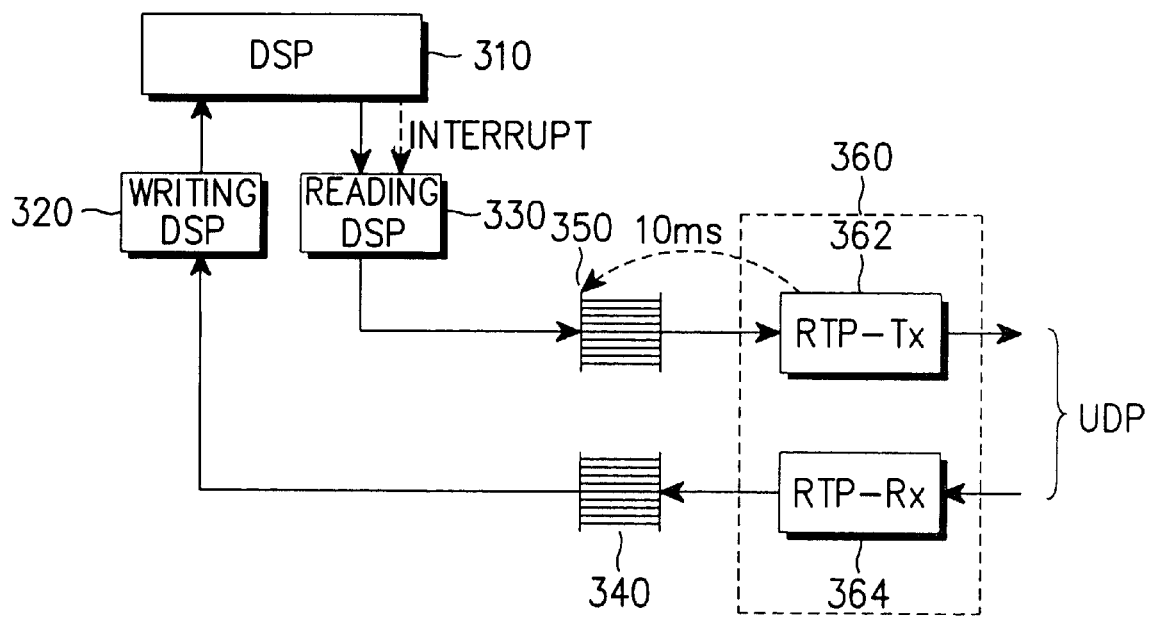
FIG. 3 is a block diagram illustrating a scheme for varying a frame structure according to an embodiment of the present invention.

FIG. 3 shows a block diagram illustrating a scheme for varying the frame structure according to an embodiment of the present invention, wherein a voice data frame is compressed prior to passing through the UDP layer during the transmission mode and restored after passing the UDP layer during the receiving mode.

In FIG. 3, a digital signal processor (DSP) 310 compresses the voice data to be transmitted and restores (or decompresses) the received voice data in the receiving end. In addition, the DSP 310 generates an interruption signal to issue a request for the transmission or the reception of the voice data. The DSP 310 generates the interrupt signal at a specific interruption period, which depends on the voice compression technique adapted by the system. As stated above, the DSP 310 is provided with the interruption period of 30 ms for the G.723.1 compression technique and 10 ms for the G.729 compression technique. Furthermore, the DSP 310 includes DSP configuration data having a variable number of packets and sets the valid flag Valid_Flag of a transmission buffer 350 so that the transmission RTP (RTP-Tx) 362 can read the voice data when the variable number of packets are all written in the transmission buffer 350.

An RTP 360 having the transmission RTP 362 and the receiving RTP 364 removes the RTP header from the voice data frame provided from the UDP and attaches a different RTP header to the voice data which is to be transmitted to the UDP in order to assemble a different voice data frame. In particular, the RTP 360 has the function of varying the structure of the voice data frame in a local area network (LAN) in accordance with the procedure shown in FIG. 4. The RTP-Tx 362 checks for the valid flag of the transmission buffer 350 at a predetermined period (e.g., 10 ms period). When the valid flag is set, the RTP-Tx 362 reads the voice data stored in the voice data storage area of the transmission buffer 350 and attaches an RTP header to the read voice data in order to assemble a voice data frame. The assembled voice data frame, as shown in FIG. 1, is transmitted to the UDP. The RTP-Rx 364 processes the RTP header of the voice data, as shown in FIG. 1, provided from the UDP to extract the actual voice data (i.e., payload data), and writes the extracted actual voice data in a specific area of the receiving buffer 340.

Figure 5:
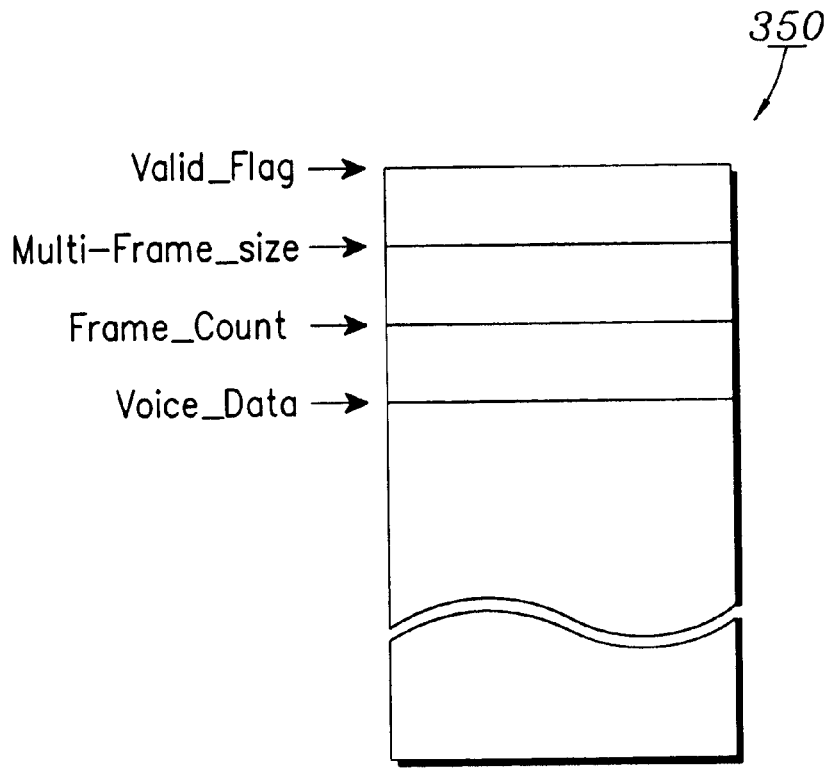
FIG. 5 is a detailed diagram illustrating a transmission buffer of FIG. 3.

A reading DSP 330 buffers the voice data provided from the DSP 310 according to the interruption service routine (ISR) function and provides the buffered voice data to the transmission buffer 350. For buffering, the reading DSP 330 writes the voice data provided from the DSP 310 in the transmission buffer 350 at every interruption period. The transmission buffer 350 writes therein the voice data provided from the reading DSP 330. The transmission buffer 350 includes the structure as shown in FIG. 5.

Similarly, a writing DSP 320 buffers the received voice data according to an interruption service routine (ISR) function and provides the buffered voice data to the DSP 310. For buffering, the writing DSP 320 reads the voice data written in the receiving buffer 340 at every interruption period and writes the read voice data in the DSP 310. The receiving buffer 340 writes therein the voice data whose RTP header is removed by the receiving RTP 364, and buffers the voice data in response to the writing DSP 320.

A detailed description of the transmission buffer 350 will be made with reference to FIG. 5. The transmission buffer 350 includes areas for storing the valid flag (Valid_Flag), the multi-frame size (Multi_Frame_Size), the frame count (Frame_Count), and the voice data (Voice_Data). The valid flag (Valid_Flag) indicates whether the number of packets, required by the DSP 310 are all written in the transmission buffer 350. For example, when Valid_Flag is set to 0, it indicates that the required number of packets is not completely stored and thus the voice data written in the transmission buffer 350 cannot accessed. However, when the Valid_Flag is set to 1, it indicates that the required number of packets are completely stored so that it is now possible to access the voice data written in the transmission buffer 350. The Multi_Frame_Size indicates the frame size according to the required packet number, and the Frame_Count indicates the number of the assembled frames. Finally, the voice data provided from the reading DSP 330 is written in the voice data area (Voice_Data) on a packet unit basis.

Figure 4:
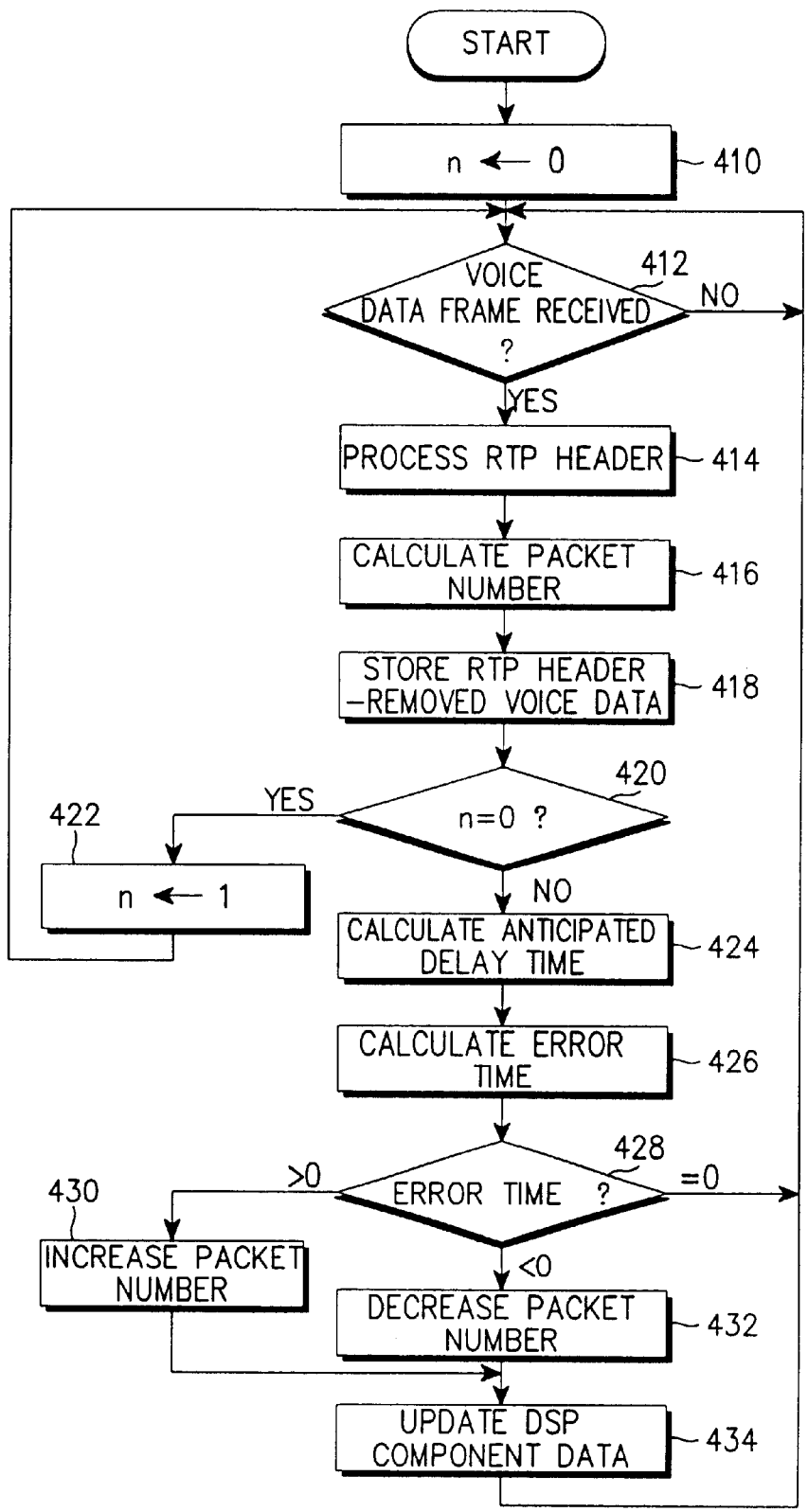
FIG. 4 is a flow chart illustrating a procedure for varying a frame 30 structure according to an embodiment of the present invention.

Meanwhile, the RTP 360 performs the operation of varying the frame structure in the LAN in accordance with the procedure shown in FIG. 4. In FIG. 4, upon the receipt of a voice data frame, the RTP 360 examines the number of packets constituting the voice data frame and the time stamp indicating the receiving time of the voice data from in order to calculate the anticipated delay time that is responsive to the number of the packets. Thereafter, the RTP 360 compares the actual delay time of a previously received voice data frame with the actual delay time of the presently received voice data frame to calculate an error time, and determines the number of packets constituting the transmission voice data frame that is responsive to the error time.

Now, a detailed description of the embodiment will be made with reference to the accompanying drawings. The voice codec as set forth in G.723.1 and G.729A, which have a sampling period of 30 ms and 10 ms, respectively, includes H.323 end point, gateway, gatekeeper, multiple control unit, and multipoint controller. The present invention will be described with reference to an H.323 RTP multi-frame algorithm that varies the frame structure according to the traffic in the internet telephony gateway or the internet phone. The present invention transmits the RTP packet (voice data frame) through the UDP port using one of the vocoder as set forth in G.723.1 and G.729A in a non-guaranteed quality of service (QoS) LAN, so as to increase the transmission efficiency and secure the real-time transmission of the voice data.

In FIG. 4, the RTP 360 distinguishes a previously received voice data frame from a subsequently received voice data frames in steps 410, 420, and 422. This is done because the previously received voice data frame does not require the number of packets to be varied. That is, the present invention varies the number of packets by measuring the delay time with respect to the previously received voice data frames so that the changing condition of the traffic can be incorporated for the transmission of the voice data for enhancing transmission efficiency. To this end, the RTP 360 sets a value "n" for distinguishing between two different voice data frame by setting the value "n" to 0, in step 410. Thereafter, when the first received voice data frame is completely processed through steps 412 to 418, the RTP 360 sets the value "n" to "1" in step 422, so that the condition is set to measure the delay time for the subsequently received voice data frame.

Figure 6:
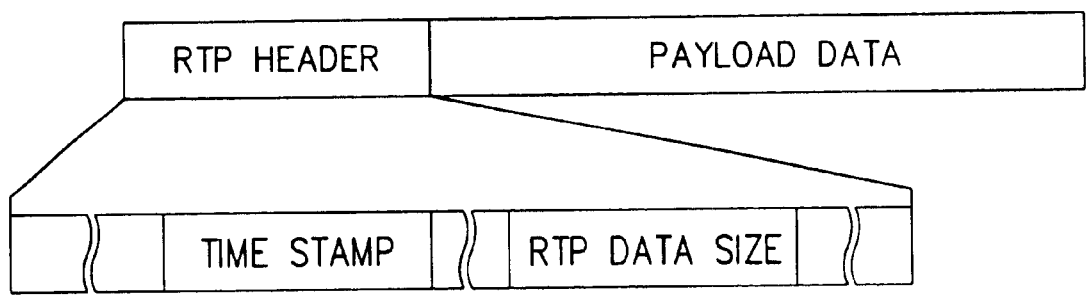
FIG. 6 is a diagram illustrating a received frame structure according to an embodiment of the present invention.

The RTP 360 determines in step 412 whether the voice data frame is received from the UDP. Here, the voice data frame has the structure as shown in FIG. 6. As illustrated in FIG. 6, the voice data frame has an RTP header having a time stamp indicating the transmission time and an RTP data size. Upon the receipt of the voice data frame, the RTP 360 processes (analyzes) the RTP header of the received voice data frame by checking the time stamp and the RTP data size, in step 414. Commonly, the transmission side of the system transmits a transmission frame together with a time stamp indicating the time interval for transmission.

After processing the RTP header, the RTP 360 determines the number of packets constituting the received voice data frame using the RTP data size, in step 416. As the packet size is fixed in the general transmission system, the number of packets can be calculated by determining how large the RTP data size in view of the fixed packet size. The calculated packet number is stored together with the time stamp in a separate storage means of the RTP 360.

After writing the time stamp and the packet number in a separate storage means in steps 414 and 416, the RTP 360 writes the RTP header-removed voice data (i.e., payload data) in the receiving buffer 340 in step 418. The writing DSP 320 then reads the written voice data in response to the interruption signal provided from the DSP 310 and writes the buffered vice data in the DSP 310. That is, the DSP 310 reads the voice data (payload data) stored in the receiving buffer 340 at every 30 ms for G.723.1 or every 10 ms for G.729A.

After writing the RTP header-removed voice data in the receiving buffer 340, the RTP 360 examines the value "n" in step 420. When the value "n" is set to "0", it means that the voice data frame received in step 412 is the first received voice data frame. Otherwise, when the value "n" is set to "1," it means that the voice data frame received in step 412 is not the first received voice data frame. Therefore, when the value "n" is set to "0," the RTP 360 changes the value "n" to "1" in step 422 to process a next voice data frame to be received by returning to step 412 through 418.

Thereafter, when the value "n" set to "1" is detected in step 420, the RTP 360 calculates the anticipated delay time in step 424. The term "anticipated delay time" as used herein refers to the duration of time required in receiving a next voice data frame after the receipt of the previous voice data frame. The anticipated delay time can be calculated by the following equation:

$$T_{ant} = F_{count} \times T_{ref} \quad (1),$$

wherein $T_{ant}$ denotes the anticipated delay time, $F_{count}$ denotes the number of packets constituting the voice data frame, and $T_{ref}$ denotes a specific time required in transmitting one packet, which depends on the type of vocoder selected. For example, when the G.723.1 vocoder is used and one frame is comprised of three packets, the anticipated delay time is 90 ms. Therefore, the anticipated delay time determined by Equation (1) represents the delay time between received voice data frames.

After determining the anticipated delay time, the RTP 360 calculates an error time in step 426 by examining the time difference between the actual delay time and the anticipated delay time. Here, the actual delay time is determined by the receiving time stamp stored in step 416 for both the previously received voice data frame and the presently received voice data frame. For example, the RTP RX task stores the corresponding time T(n) when the RTP RX task receives the first multi-frame, and in the same manner, the RTP RX task stores the corresponding time T(n+1) when the RTP RX task receives the second multi-frame. Then, the true time period spent on transmission is the interval between the time T(n+1) and T(n), namely T(n−1) minus T(n). At step 426, the error time is calculated using the actual delay time and the anticipated delay time determined in step 424 as shown in the following equation:

$$\text{Dif\_Time} = T(n+1) - T(n) - T_{ant} \quad (2),$$

wherein Dif_Time represents the error time (or difference time), T(n+1) represents the arrival time of the currently received RTP packet and T(n) denotes the arrival time of the previously received RTP packet, $T_{ant}$ represents the anticipated delay time determined in step 424.

After calculating the error time, the RTP 360 compares the error time with a threshold value (e.g., "0"), in step 428, to determine whether to increase in step 430 or decrease the packet number in step 432. The threshold value can be varied. For example, the threshold value can be set to "5" for the G.723.1 vocoder. In this case, when the error time is larger than "5", the number of packets constituting the transmission frame is increased, and when the error time is less than "5," the number of packets constituting the transmission frame is decreased.

Moreover, it is possible to set a specific range in step 428, instead of using the fixed threshold value. In such case, when the error time is greater than the upper limit of the specific range, the packet number of the transmission frame is increased. When the error time is less than the lower limit of the specific range, the packet number of the transmission frame is decreased. However, when error time falls within the specific range, the present packet number is maintained. For example, if the specific range is set from "+3" to "−3", then the number of packets for the transmission frame is increased by a predetermined value when the error time is larger than "+3." Otherwise, the number of packets for the transmission frame is decreased by a predetermined value when the error time is less than "−3." In the even that the error time value is equal to any one of the values within the specific range, the packet number is maintained. Thereafter, in step 434, the RTP 360 updates the DSP data with the newly changed packet number, and sets a valid flag of the transmission buffer 250 in response to the newly changed packet number. Then, the number of packets determined in step 434 is read from the transmission buffer in order to assemble a voice data frame.

Although the present invention has been described with reference to an embodiment in which the time stamp represents the reference processing time of 30 ms or 10 ms according to the type of the vocoder selected in the transmission side of the system, it is also possible to have the time stamp to indicate the time determined according to the number of packets constituting the transmission frame. In such case, the time determined in the transmission side of the system represents the time identical to the anticipated delay time calculated in step 424. Therefore, the execution steps shown in FIG. 4 are simplified, and the packet number stored in step 416 and the anticipated delay time calculated in step 424 become meaningless. As the result of such simplification, the receiving side of the system checks only the time stamp included in the RTP header to perform the steps from step 426 to 434 in response to the time stamp, instead of the anticipated delay time.

While there have been illustrated and described what are considered to be the preferred embodiments of the present invention, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for assembling a voice data frame in a voice data processing system, the method comprising the steps of:
   storing, upon receiving the voice data frame, a current receiving time of the voice data frame in a storage means;
   analyzing a real-time protocol (RTP) header included in the voice data frame to determine a reference processing time of the voice data frame and a packet number representing a number of packets constituting the voice data frame, and storing the reference processing time and the number of packets in the storage means;
   in the event that there is a previously received voice data frame, calculating an anticipated delay time using the reference processing time and the packet number stored in the storage means;
   calculating an error time according to the difference between an actual delay time and the calculated anticipated delay time, wherein the actual delay time is determined according to the difference between the current receive time and a previous receiving time of the previously received voice data frame;
   increasing the number of packets constituting a transmission frame by a first predetermined value when the error time is greater than an upper limit of a specific range;
   decreasing the number of packets constituting a transmission frame by a second predetermined value when the error time is less than a lower limit of the specific range.

2. The method as claimed in claim 1, wherein the anticipated delay time is determined by multiplying the stored reference processing time by the packet number.

3. The method as claimed in claim 2, wherein the reference time represents a predetermined time required in transmitting one of the packets.

4. The method as claimed in claim 3, the method further comprising the steps of:

updating DSP (Digital Signal Processor) control data with the newly changed packet number for assembling a next voice data frame;

setting a valid flag in a transmission buffer when the number of packets are written responsive to the newly changed packet number in the transmission buffer; and, reading the number of packets stored in the transmission buffer into a next transmission frame.

5. A method for assembling a voice data frame in a voice data processing system, the comprising the steps of:

upon receiving the voice data frame having an RTP header and a data field, storing a current stamp time of the RTP header and a packet number representing a number of packets constituting the voice data frame;

removing the RTP header included in the voice data frame and storing the data field in a receiving buffer;

calculating an anticipated delay time when there is a previously received voice data frame;

calculating an error time according to the difference between an actual delay time and the anticipated delay time;

increasing the number of packets constituting a transmission frame by a first predetermined value when the error time is greater than a predetermined threshold value;

decreasing the number of packets constituting a transmission frame by a second predetermined value when the error time is less than the predetermined threshold value;

updating DSP (Digital Signal Processor) control data with the newly changed packet number for assembling a next voice data frame;

setting a valid flag in a transmission buffer when the number of packets are written responsive to the newly changed packet number in the transmission buffer; and, reading the number of packets stored in the transmission buffer into a next transmission frame.

6. The method as claimed in claim 5, wherein the anticipated delay time is determined by multiplying the stored reference processing time by the packet number.

7. The method as claimed in claim 6, wherein the actual delay time is determined according to the difference between the current receive time and the previous receiving time of the previously received voice data frame.

* * * * *